United States Patent
Khan et al.

(10) Patent No.: US 7,782,521 B2
(45) Date of Patent: Aug. 24, 2010

(54) SYSTEM AND METHOD FOR DISPLAYING IMAGES

(75) Inventors: Sajjad Ali Khan, Plano, TX (US); Terry Alan Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/756,469

(22) Filed: May 31, 2007

(65) Prior Publication Data

US 2008/0298424 A1  Dec. 4, 2008

(51) Int. Cl.
G02B 26/00 (2006.01)
(52) U.S. Cl. ...................... 359/290; 359/291
(58) Field of Classification Search ................. 359/290, 359/291
See application file for complete search history.

(56) References Cited

U.S. PATENT DOCUMENTS

| | | | |
|---|---|---|---|
| 4,992,880 A | 2/1991 | Trias | |
| 5,202,785 A | 4/1993 | Nelson | |
| 5,212,582 A | 5/1993 | Nelson | |
| 5,233,456 A | 8/1993 | Nelson | |
| 5,392,151 A | 2/1995 | Nelson | |
| 5,576,880 A | 11/1996 | Chang | |
| 5,909,304 A | 6/1999 | Chang | |
| 6,092,900 A | 7/2000 | Diedrich et al. | |
| 6,426,836 B2 | 7/2002 | Dorsel et al. | |
| 6,747,781 B2 | 6/2004 | Trisnadi | |
| 6,775,049 B1 * | 8/2004 | So | 359/291 |
| 7,095,541 B2 | 8/2006 | Liu | |
| 2003/0117711 A1 * | 6/2003 | Kowarz et al. | 359/618 |
| 2004/0130768 A1 * | 7/2004 | Thoma et al. | 359/239 |
| 2005/0024699 A1 * | 2/2005 | Liu | 359/196 |
| 2005/0190140 A1 * | 9/2005 | Asahi et al. | 345/100 |
| 2005/0213189 A1 * | 9/2005 | Schroeder | 359/291 |

* cited by examiner

*Primary Examiner*—Jordan M. Schwartz
*Assistant Examiner*—James C Jones
(74) *Attorney, Agent, or Firm*—Charles A. Brill; Wade James Brady, III; Fredrick J. Telecky, Jr.

(57) ABSTRACT

A system and method for reducing visible speckle in images displayed using coherent light. In an embodiment, a system for displaying images includes a light source to produce coherent light, an array of light modulators optically coupled to the light source and positioned in a light path of the light source after the light source, and a controller electronically coupled to the array of light modulators and to the light source. The light source includes a coherent light source, and a first digital micromirror device (DMD) having a first plurality of micromirrors. The first DMD is optically coupled to the coherent light source and positioned in a light path of the coherent light source after the coherent light source. The first DMD directs coherent light by moving the micromirrors of the first plurality of micromirrors through a first range of tilt angles substantially continuously.

14 Claims, 6 Drawing Sheets

SYSTEM AND METHOD FOR DISPLAYING IMAGES

TECHNICAL FIELD

The present invention relates generally to a system and method for displaying images, and more particularly to a system and method for reducing visible speckle in images displayed using coherent light.

BACKGROUND

A coherent light source, such as a laser, may be used to replace a wideband light (light that encompasses a wide range of wavelengths) source, such as a lamp, and/or a narrowband light (light that encompasses a small range of wavelengths) source, such as a light emitting diode (LED), in projection display systems. When a wideband light source is used in a projection display system, color filters may generally be used to create light with desired colors (wavelengths). The use of a narrowband light source may eliminate the color filter. For example, in a projection display system, such as a microdisplay-based projection display system, narrowband coherent light at desired wavelengths produced by multiple lasers may replace a wideband light produced by an electric arc lamp that requires color filters to produce the desired colors of light. Furthermore, besides a laser's compactness and small form factor, the coherent light from a laser may typically be brighter than light produced by LEDs, may have a small etendue, and may be more efficient in terms of energy consumption. Therefore, a reduction in the size of an illumination system used in the microdisplay-based projection display system may be realized compared with an LED or lamp-based system.

Coherent light may be used to illuminate a digital micromirror device (DMD), a form of microdisplay. The DMD may be a part of a microdisplay-based projection display system. The DMD may contain a large number of micromirrors arranged in an array. The DMD is also commonly referred to as an array of light modulators. The micromirrors in the DMD are typically in one of two states (positions) depending on data from an image being displayed. In a first state, a micromirror may reflect the coherent light onto a display plane, and in a second state, the micromirror may reflect the coherent light away from the display plane. The coherent light reflecting off the large number of micromirrors onto the display plane combines to create the image on the display plane.

When coherent light is scattered by a rough surface, such as a display plane, a modulating spatial noise with high contrast may be produced. The modulating spatial noise, commonly referred to as speckle, may be highly objectionable to viewers. Light fields from each individual scatterer in the display plane may add coherently and sum as phasors, resulting in a randomly varying intensity across the display plane.

Speckle generally originates when a plane phase-front from a coherent light source traverses through a medium with optical path length differences that are less than or equal to a coherence length of the laser, where the coherence length may be expressed as:

$$L = \frac{c}{\Delta v} = \frac{\bar{\lambda}^2}{\Delta \lambda},$$

where c is the speed of light, $\bar{\lambda}$ is the mean source wavelength, and $\Delta\lambda$ is the source spectral linewidth. Such path length differences may occur due to surface roughness, screen roughness, scratches, digs, dings, polishing imperfections, and so forth, in optical elements.

Speckle reduction and elimination have received considerable attention from scientists and system designers. Speckle reduction techniques may include light beam steering, which may reduce speckles by rapidly moving the light beam so that the speckles created do not remain stationary. The human eye may then average the speckles, making them less noticeable.

One such technique involves the use of an acousto-optic deflector to steer the coherent light beam using a radio frequency signal. Acousto-optic deflectors offer high speed operation (on the order of a few microseconds) to enable some speckle reduction but they have small rectangular apertures. Galvanometric mirrors may also be used to reduce speckles by steering the phase-front of the coherent light beam. Galvanometric mirrors offer a variety of optical aperture sizes and wide steering angles, but are slower in speed as compared to acousto-optic deflectors and have a non-linear scan response time. Their scan response time is inversely related to the aperture size and hence a larger aperture means a slower response time and vice versa.

SUMMARY OF THE INVENTION

These and other problems are generally solved or circumvented, and technical advantages are generally achieved, by embodiments of a system and a method for reducing visible speckle in images displayed using coherent light.

In accordance with an embodiment, a light source is provided. The light source includes a coherent light source to produce coherent light, a first digital micromirror device containing a first plurality of micromirrors, optically coupled to the coherent light source and positioned in a light path of the coherent light source after the coherent light source, and a controller electrically coupled to the first digital micromirror device. The first digital micromirror device substantially continuously steers the coherent light with the first plurality of micromirrors, and the controller provides micromirror control commands to the first digital micromirror device.

In accordance with another embodiment, a display system is provided. The display system includes a light source to produce coherent light, an array of light modulators optically coupled to the light source and positioned in a light path of the light source after the light source, and a controller electronically coupled to the array of light modulators and to the light source. The array of light modulators produces images by modulating light from the light source based on image data, and the controller loads image data into the array of light modulators and controls movement of micromirrors in the first plurality of micromirrors. The light source includes a coherent light source to produce coherent light, and a first digital micromirror device having a first plurality of micromirrors, optically coupled to the coherent light source and positioned in a light path of the coherent light source after the coherent light source. The first digital micromirror device directs the coherent light by moving the micromirrors of the first plurality of micromirrors through a first range of tilt angles continuously.

In accordance with another embodiment, a method for operating a light source is provided. The method includes illuminating a digital micromirror device with coherent light, wherein the digital micromirror device contains a plurality of micromirrors, and moving the micromirrors in a substantially continuous motion.

An advantage of an embodiment is that the use of a digital micromirror device (DMD) to steer the coherent light beams enables the rapid movement of the coherent light beams with large optical aperture and wide steering angle, all of which may help significantly reduce speckle.

A further advantage of an embodiment is that DMDs enable mass fabrication. This may significantly reduce the cost of the speckle reduction hardware, thereby minimizing impact on the overall cost of an imaging system containing the speckle reduction hardware. Additionally, DMDs are integrated circuits and typically offer greater reliability than discrete components.

Yet another advantage of an embodiment is that DMDs utilize low drive power, and there exists a mature set of support electronics. Therefore, implementing a DMD-based speckle reducing technique may be simpler and may be developed with a smaller time investment and with a lower monetary investment than other alternatives.

Yet another advantage of an embodiment is that the DMDs may be partitioned into groups of micromirrors that may be operated independently and asynchronously to create multiple independent beams of coherent light that may continuously scan the entirety of the angular scan zone in a random fashion, further reducing the appearance of speckles.

Yet another advantage of using DMDs is the fact that even if some micromirrors may not be operating as desired, they may not contribute to lost light, since light from the DMD may be captured in all tilt angle orientations of the micromirrors resulting in a system with a high degree of fault tolerance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a DMD-based image display system illuminated by coherent light, such as from a laser light source. The embodiments may also be applied, however, to other image display systems illuminated by coherent light, such as those utilizing transmissive or reflective liquid crystal displays, liquid crystal on silicon, ferroelectric liquid-crystal-on-silicon, deformable micromirrors, and other forms of microdisplays and spatial light modulators. Additionally, the embodiments may be applied to other applications where the ability to steer light beams is desired such as one and two dimensional bar-code scanners, laser light shows and inventory counters for use in inventory control systems. Temporal amplitude modulation of the source laser in synchronization with the beam steering may also be used to form one dimensional images. Two dimensional images may be formed using either a second continuously steering DMD or a slower scanning analog resonant mirror.

Furthermore, the embodiments may be used to steer headlights of automobiles, wherein the headlights may be aimed depending upon the angle of the steering wheel to help improve visibility. The percentage (or number) of micromirrors in a digital micromirror device may be tilted in a particular direction based on a change in the angle of the steering wheel to help improve visibility for the driver of the automobile. A change in the tilt angle of the micromirrors, as well as the number of the micromirrors tilted, may be based on the angle of the steering wheel and its rate of change. By maintaining some micromirrors at a straight forward tilt angle while tilting others based on the angle of the steering wheel, a wide band of illumination may be created.

Figures 1A, 1B, 2A:
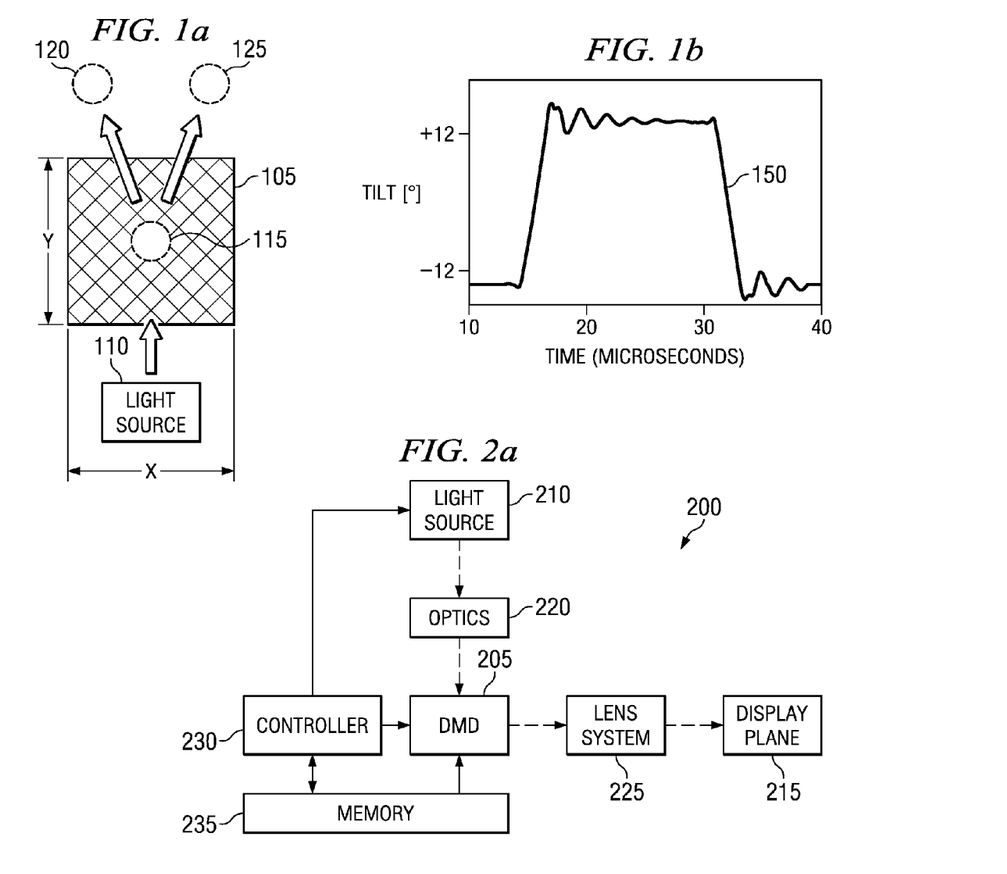
FIGS. 1a and 1b are diagrams of bi-stable discrete light steering by a digital micromirror device and a data plot of micromirror tilt angle as a function of time.
FIGS. 2a through 2d are diagrams of exemplary digital micromirror based projection display systems, and a detailed view of light sources.

With reference now to FIGS. 1a and 1b, there are shown diagrams illustrating bi-stable discrete light steering operation of a DMD operating in a bi-stable mode with an extended period of time between ON and OFF state transitions and a data plot of micromirror tilt as a function of time. The diagram shown in FIG. 1a illustrates the light steering operation of a DMD 105 that is illuminated by a light source 110 with the DMD 105 operating in a bi-stable mode with an extended period of time between ON and OFF state transitions. In this example, the micromirrors of the DMD 105 pivot about hinges oriented in the Y direction, therefore, the micromirrors pivot left to right and right to left.

An exemplary light beam shining on the DMD 105 may result in a light spot 115. When micromirrors illuminated by the light spot 115 are in a first state, for example, the ON state, the light spot 115 may reflect towards the left side, resulting in a reflected light spot 120. When the micromirrors are in the OFF state, the light spot 115 may reflect towards the right side, resulting in a reflected light spot 125. With the micromirrors spending an extended period of time in either the ON or the OFF states, a trace of light spots as the reflected light spot moves from the reflected light spot 120 to the reflected light spot 125 may be negligible and may not be visible.

The diagram shown in FIG. 1b illustrates micromirror tilt angle as a function of time (trace 150) for an exemplary micromirror of the DMD 105. The trace 150 shows that for a majority of the time, the micromirror has a tilt angle of about −12 degrees or +12 degrees with respect to a normal, representing the ON state and the OFF state. Also shown are the transitions between states and a settling of the micromirror as it comes to a stop after it completes each transition.

With reference now to FIG. 2a, there is shown a high-level diagram illustrating an exemplary DMD-based projection display system 200. The DMD-based projection display system 200, includes a DMD 205 that modulates light produced by a light source 210. The DMD 205 is an example of a microdisplay or an array of light modulators. Other examples of microdisplays may include transmissive or reflective liquid crystal, liquid crystal on silicon, deformable micromirrors, and so forth. In a microdisplay, a number of light modulators may be arranged in a rectangular, square, diamond shaped, and so forth, array. Each light modulator in the microdisplay may operate in conjunction with the other light modulators in the microdisplay to modulate the light produced by the light source 210. The light modulated by the DMD 205 may be used to create images on a display plane 215. The DMD-based projection display system 200 also includes an optics system 220, which may be used to collimate the light produced by the light source 210 as well as to collect stray light, and a lens system 225, which may be used to manipulate (for example, focus) the light reflecting off the DMD 205.

The DMD 205 may be coupled to a controller 230, which may be responsible for loading image data into the DMD 205, controlling the operation of the DMD 205, providing micromirror control commands to the DMD 205, controlling the light produced by the light source 210, and so forth. A memory 235, which may be coupled to the DMD 205 and the controller 230, may be used to store the image data, as well as configuration data, color correction data, and so forth.

Figure 2B:
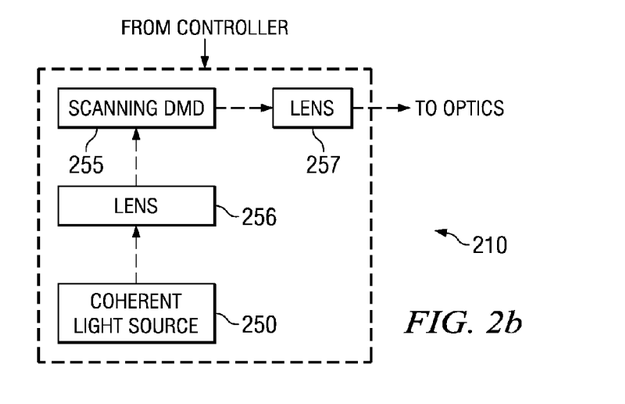

The diagram shown in FIG. 2b illustrates a detailed view of the light source 210. The light source 210 of the DMD-based projection display system 200 may utilize a coherent light source 250, such as a laser, to produce coherent light at a desired wavelength. Multiple coherent light sources may be used to produce coherent light at different desired wavelengths. A red laser, for example, may produce coherent light in the red color spectrum. Similarly, a green laser and a blue laser may produce coherent light in the green and blue color spectra, respectively. Moreover, each color laser may consist of an array of emitters arranged in one or two dimensions. These emitters may also be displaced with respect to each other along the third dimension.

The light source 210 also includes one or more scanning DMDs 255, which may be a standard DMD configured to operate in a continuous movement mode. The scanning DMD 255 may be controlled by the controller 230. The controller 230 may be used to configure the scanning DMD 255, control the movements of the micromirrors of the scanning DMD 255, start and stop the movements of the micromirrors, and so forth. The scanning DMD 255 may be used to steer the coherent light beam produced by the coherent light source 250. The steering of the coherent light beam from the coherent light source 250 should preferably be at a sufficiently fast rate so that the speckle pattern may be averaged by the human eye. The steering generally should occur at a rate in the range of 2 to 10 microseconds. Since only the speckles from a static image are visible, the fast temporal steering as provided by the scanning DMD 255 may result in averaging or smoothing of the speckle pattern. A first lens 256 may serve to collimate the light rays from the coherent light source 250 onto a plane of the scanning DMD 255, while a second lens 257 may serve to redirect the scanned light reflecting from the scanning DMD 255 so that the scanned light falls mainly onto the optics 220.

Although shown in FIG. 2b as a single DMD, the scanning DMD 255 may comprise two or more DMDs. The use of two DMDs may allow for a two-dimensional steering of the coherent light from the coherent light source 250. Similarly, the coherent light source 250 may include multiple narrow band coherent light sources to produce the desired colors of light.

The scanning DMD 255 may utilize the same type of DMD used in the DMD 205. However, since several optical performance characteristics of a typical DMD may not be crucial to the performance of the scanning DMD 255, such as resolution (the number of micromirrors in the DMD), speed of micromirror transition, minimum number of acceptable failed micromirrors, and so forth, a DMD used in the scanning DMD 255 may not need to have as stringent performance specifications as a DMD used in the DMD 205. This may permit the use of an older generation DMD, DMDs with a few inoperable micromirrors to be used in displaying images, and so forth, although potentially at the cost of increased speckle due to increased number of static micro-mirrors. As shown in FIG. 2b, light efficiency loss in the event of failed micromirrors may not be significant since the scanning DMD 255 steers light from both the on and the off states into an optical system of the DMD-based projection display system 200. To maximize the speckle reducing performance of the scanning DMD 255, a DMD selected for use as the scanning DMD 255 generally should have a large tilt angle swing between the ON state and the OFF state. Examples of large tilt angles may include +/−8 degrees, +/−10 degrees, +/−12 degrees, +/−14 degrees, +/−16 degrees, and so on. The degree of speckle reduction may be dependent upon the tilt angle, with higher tilt angles resulting in greater speckle reduction.

Figure 2C:
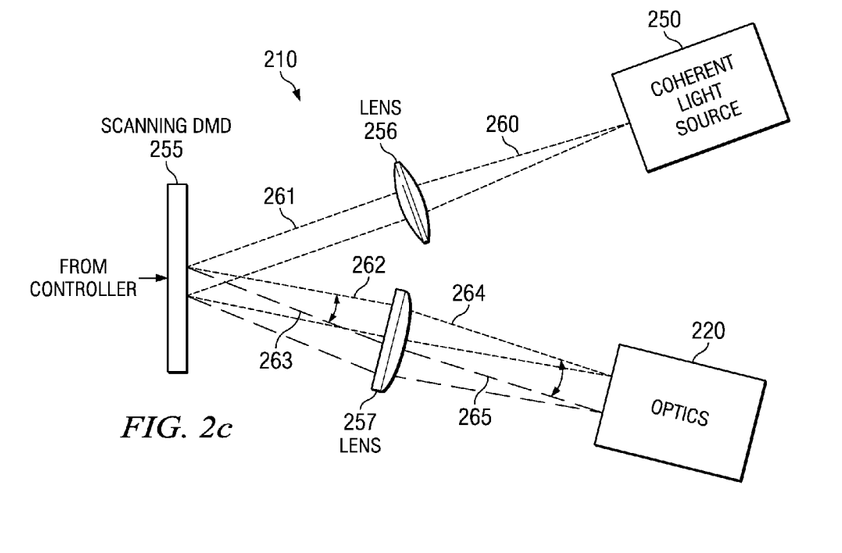

The diagram shown in FIG. 2c illustrates a detailed view of light source 210. Light source 210 includes the coherent light source 250, the scanning DMD 255, the first lens 256, and the second lens 257. The lens system 220 may be considered as part of the DMD-based projection display system 200, but not of the light source 210. The lens system 220 may include an integrating rod, lenslet integrators, diffractive optical elements, or other optical components for generating a uniform light illumination on the DMD 205.

FIG. 2c illustrates the effect of the continuously moving micromirrors on the coherent light produced by the coherent light source 250. A first coherent light beam 260 originating from the coherent light source 250, may be bent towards a normal of the first lens 256 as it passes through the first lens 256 and becomes a second coherent light beam 261. The second collimated coherent light beam 261 is incident on the scanning DMD 255, wherein micromirrors operating in a continuous movement mode generally steer the second coherent light beam 261 over an entirety of its tilt angle range. A third coherent light beam 262 and a fourth coherent light beam 263 illustrate the maximum extent of the steering from the micromirrors of the scanning DMD 255. As the third coherent light beam 262 and the fourth coherent light beam 263 pass through the second lens 257, they may again be bent back towards the normal. For example, the third coherent light beam 262 becomes the fifth coherent light beam 264 and the fourth coherent light beam 263 becomes the sixth coherent light beam 265. At this point, the coherent light from the coherent light source 250 exits the light source 210 and enters the first lens system 220.

Figure 2D:
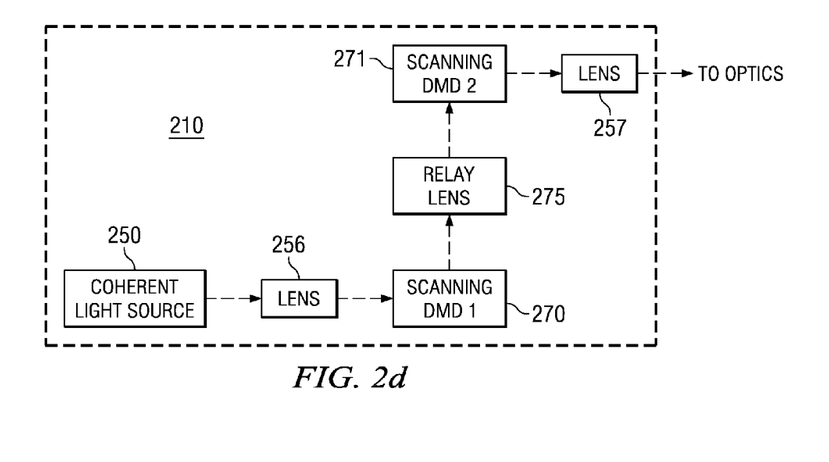

The diagram shown in FIG. 2d illustrates a high-level view of light source 210, wherein light source 210 includes two scanning DMDs. The light source 210 includes two scanning DMDs, a first scanning DMD 270 labeled "SCANNING DMD 1" and a second scanning DMD 271 labeled "SCANNING DMD 2." The two scanning DMDs should be arranged so that their pivotal axes are orthogonal to each other. The first scanning DMD 270 may be illuminated by coherent light from the coherent light source 250 after collimation by the first lens 256. The first scanning DMD 270 may create a one-dimensional fan light beam from the light from the coherent light source 250. A relay lens 275 may redirect the scanned light reflecting from the first scanning DMD 270 so that the light falls mainly onto the second scanning DMD 271. The second scanning DMD 271 may be illuminated by light from the relay lens 275 and may create a two-dimensional rectangular light beam from the one-dimensional fan light beam from the first scanning DMD 270. The second lens 256 may then serve to redirect the two-dimensional rectangular light beam from the second scanning DMD 271 so that the scanned light falls mainly onto the optics 220.

The diagram shown in FIG. 2d illustrates the light source 210 with two scanning DMDs, wherein the two scanning DMDs are arranged in a series configuration. It may also be possible to arrange the two scanning DMDs in a parallel configuration. In a parallel configuration, a beam splitter may be used to split a light beam from the coherent light source 250 and the first lens 256 into two light beams, with each light beam incident on a single scanning DMD. The two scanning DMDs should be arranged so that their pivotal axes are orthogonal to each other. Then, a beam combiner (e.g.: a polarizing beam splitter) may be used to combine reflected light from the two scanning DMDs into a single light beam.

Figure 3A:
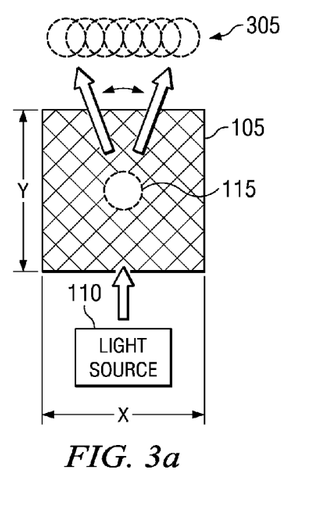
FIGS. 3a and 3b are diagrams of continuous light steering by a digital micromirror device and a data plot of micromirror tilt angle as a function of time.
Figure 3B:
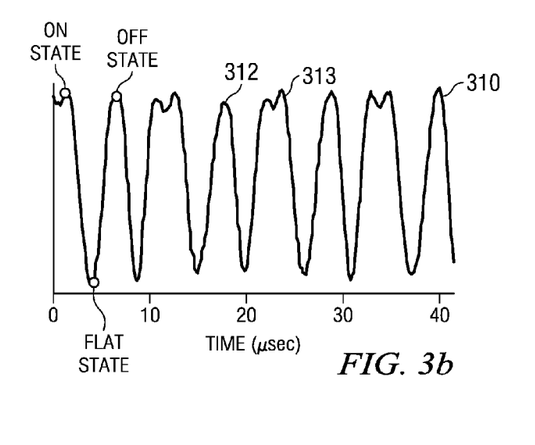

With reference now to FIGS. 3a and 3b, there are shown diagrams illustrating continuous light steering operation of a DMD operating in a continuous movement mode and a data plot of micromirror tilt as a function of time. The diagram shown in FIG. 3a illustrates the light steering operation of the DMD 105 that is illuminated by the light source 110 with the DMD 105 operating in a continuous movement mode. In this example, the micromirrors of the DMD 105 pivot about hinges oriented in the Y direction, therefore, the micromirrors pivot left to right and right to left.

Since the micromirrors of the DMD 105 are in continuous motion between the ON state and the OFF state, the light spot 115 may reflect to produce a substantially continuous trail of light 305. The actual appearance of the trail of light 305 may depend on the actual motion of the micromirrors. For example, if the micromirrors may spend a slightly disproportionate amount of time at the ON and OFF states, there may be bright spots at the respective ends of the trail of light 305. Alternatively, if the micromirrors spend very little time at the ON and OFF states, there may be dim spots at the respective ends of the trail of light 305.

The diagram shown in FIG. 3b illustrates reflected light from a surface of a micromirror as a function of time (trace 310) for an exemplary micromirror of the DMD 105. The reflected light may be as measured by a light sensor positioned at a distance away from the DMD 105. The trace 310 shows that the reflected light, as measured at the light sensor, may vary relatively continuously from a maximum that occurs when the micromirror is either in an on state or an off state to a minimum that occurs when the micromirror is in a flat state. The relatively smooth transition observed in the reflected light when the micromirror transitions into and out of an off state (as shown at peak 312) when compared to the reflected light when the micromirror transitions into and out of an on state (as shown at peak 313) may indicate that it may be possible to reconfigure a drive waveform used to drive the micromirror so that the micromirror makes a smooth sinusoidal transition through its entire range of motion. The period of the motion of the micromirror, or simply time period, shown in FIG. 3b is about 12 microseconds with a preferred period being less than about twenty (20) microseconds. With slight modifications to the driving waveform, the time period may be further reduced to less than 10 microseconds. Moreover, the time period may also be controlled by controlling either the dimensions of the micromirror during fabrication, the tilt angle or the drive voltage, and combinations thereof.

In order to reduce speckle to a low level, the time period of the micromirror should be determined by a frame refresh rate of the DMD-based projection display system. For example, the time period of the scanning DMD should be less than 16.67 milliseconds for a projection display system with a 60 Hz frame rate to ensure that one complete cycle of light steering may occur within a single frame time. With the 12 microsecond period shown in FIG. 3b, the scanning DMD may provide about 1389 scans within a single 16.67 millisecond frame time. This time period may be effectively fast enough for use with projection display technologies in current use. For a display system with a faster frame rate such as a sequential color projection display system or a grating light valve based projector, the time period of the scanning DMD should accordingly be shorter to ensure optimum speckle reduction.

Figure 4:
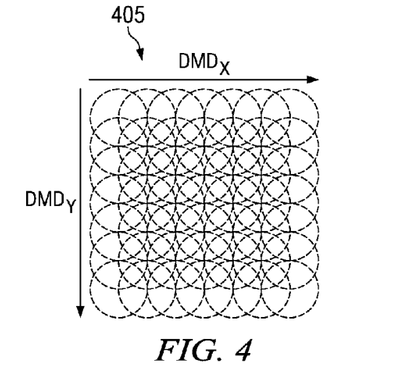
FIG. 4 is a diagram of a reflected light pattern from two digital micromirror devices operating in a continuous movement mode.

With reference now to FIG. 4, there is shown a diagram illustrating a reflected light pattern 405 from two DMDs operating in a continuous movement mode. According to an embodiment, the two DMDs may be arranged so that their pivotal axes are orthogonal to each other. A first of the two DMDs may be used to create the X axis component of the reflected light pattern 405 and a second of the two DMDs may be used to create the Y axis component of the reflected light pattern 405.

Figure 5:
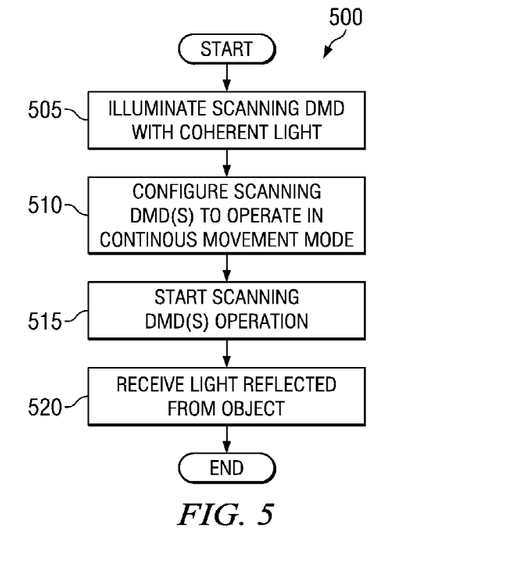
FIG. 5 is a block diagram of a sequence of events in operating a light source.

With reference now to FIG. 5, there is shown a block diagram illustrating a sequence of events 500 in the operation of a light source utilizing a scanning DMD. The operation of a light source utilizing a scanning DMD (or scanning DMDs) may begin with the illumination of the scanning DMD with a coherent light from the light source (block 505). The illumination of the scanning DMD generally should illuminate the micromirror surface of the scanning DMD substantially evenly. The illuminating may be followed (or proceeded) with a configuring of the scanning DMD so that it will operate in a continuous movement mode (block 510). The scanning DMD may be configured so that all of its micromirrors may be operating in unison. Alternatively, the micromirrors of the scanning DMD may be partitioned into groups and the separate groups may be operated asynchronously from one another. For example, the different groups may be controlled so that they move at different speeds, spend more time at different states, operate slightly off synch, and so forth. Once configured, the scanning DMD may then be put into operation (block 515). Once the scanning DMD has been placed into operation, the light source may optionally receive a reflected light, wherein the reflected light comprises light from the light source after it has reflected from an object external to the light source (block 520). The scanning DMD may be configured so that it will continue its operation until a system containing the light source is powered off, reset, or so forth. The order of the events in this sequence may be changed, the sequence may be performed in a different order, or some of the steps may be performed at the same time without altering the resulting light output of the light source.

Figures 6, 7:
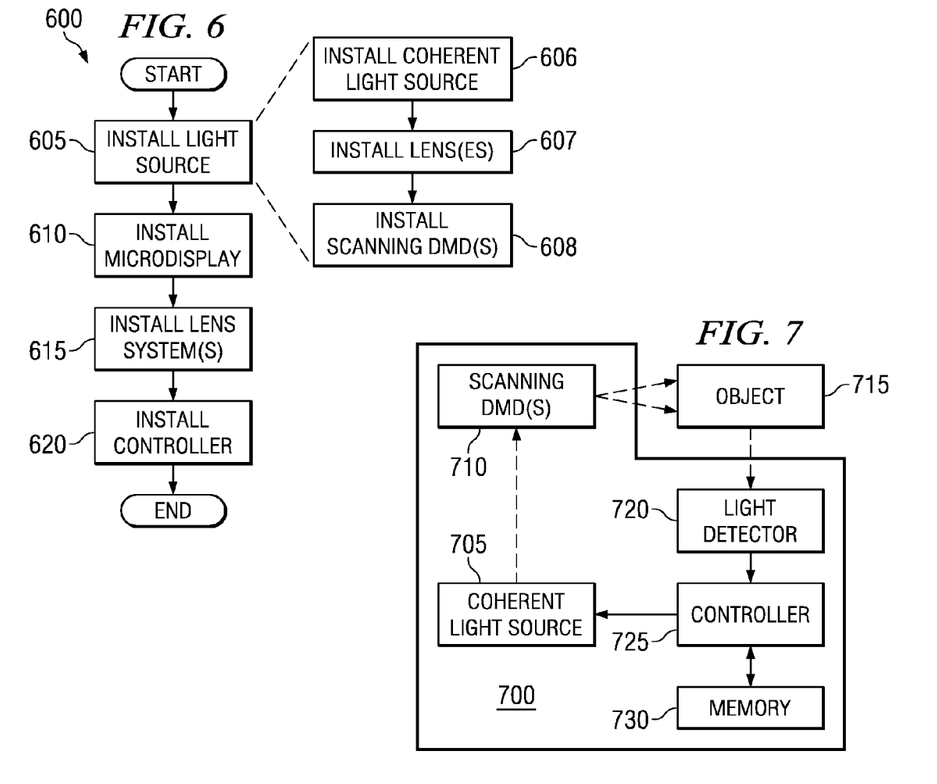
FIG. 6 is a block diagram of a sequence of events in manufacturing a digital micromirror based projection display system.
FIG. 7 is a block diagram of a scanner.

With reference now to FIG. 6, there is shown a block diagram illustrating a sequence of events 600 in the manufacture of an exemplary DMD-based projection display system. The manufacture of the microdisplay-based projection display system may begin with installing a light source, which may produce multiple colors of light (block 605). The installing of the light source may include the installing of a coherent light source (block 606), followed by the installing of a lens or lenses (block 607) and then the scanning DMD or the scanning DMDs (block 608). The manufacture may continue with installing a microdisplay, such as a DMD, in the light path of the multiple colors of light produced by the light source (block 610). After installing the microdisplay, a lens system may be installed between the light source and the microdisplay (block 615). A controller for the microdisplay-based projection display system may then be installed (block 620). The order of the events in this sequence may be changed, the sequence may be performed in a different order, or some of the steps may be performed at the same time to meet particular manufacturing requirements of the various embodiments of the light source, for example.

With reference now to FIG. 7, there is shown a block diagram illustrating a scanner 700. The scanner 700 uses light produced by a coherent light source 705 that has been steered by a scanning DMD 710 to help ease the targeting of an object 715 to be scanned by a user of the scanner 700. The scanner 700 also includes a light detector 720 to detect light reflecting from the object 715. Electrical information from the light detector 720 may then be provided to a controller 725, which may then process the electrical information. A memory 730 coupled to the controller 725 may contain a database that may be used by the controller 725 in its processing of the electrical information. For example, the scanner 700 may be used as a price scanner and the electrical information may correspond to a scan of a universal product code (UPC) of the object 715. The controller 725 may search the database stored in the memory 730 for the price of the object 715. Alternatively, the processor 725 may simply store the electrical information in the memory for subsequent processing. The scanner 700 may also be used in inventory tracking, inventory control, shipping control, and other applications.

Figure 8A:
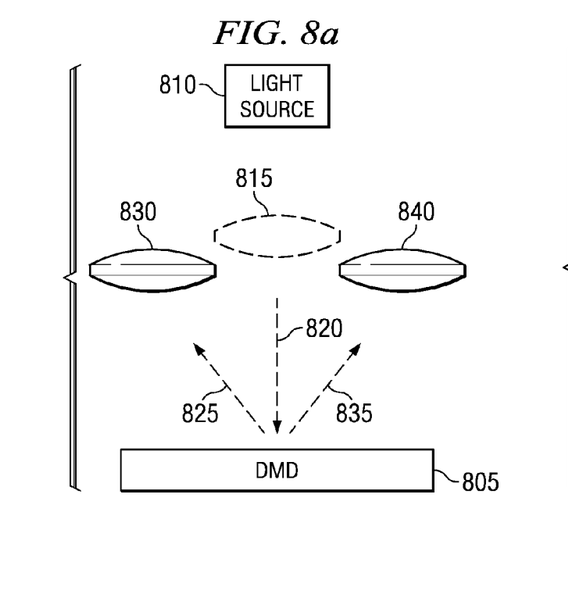
FIGS. 8a and 8b are diagrams of trails of light produced by an illuminated digital micromirror device operating in a bi-stable mode with an extended amount of time spent in the bi-stable states and in a continuous movement mode, respectively.
Figure 8B:
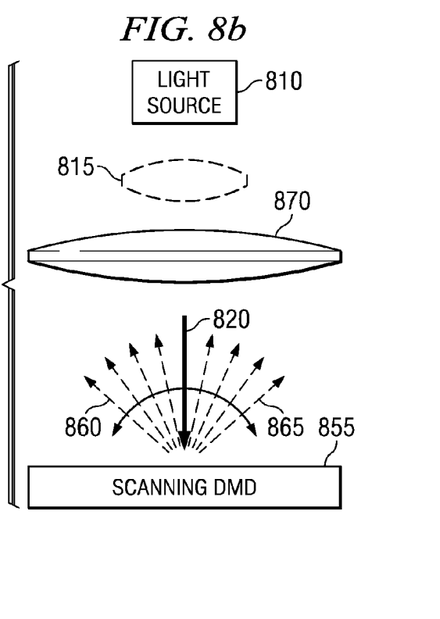

With reference now to FIGS. 8a and 8b, there are shown diagrams trails of light produced by illuminated digital micromirror devices. The diagrams are based on photographs of light paths produced by a scanning DMD. The illuminated digital micromirror devices may be operating in a bi-stable mode with an extended amount of time spent in the bi-stable states and in a continuous movement mode, respectively. The diagram shown in FIG. 8a illustrates a DMD 805 illuminated by light from a light source 810, wherein light from the light source passes through an aperture 815 to produce a light beam 820. About one half of the micromirrors of the DMD 805 are in a first state, reflecting the light beam 820 to form a light beam 825 and creating a light spot 830 on a display plane. About one half of the micromirrors of the DMD 805 are in a second state, reflecting the light beam 820 to form a light beam 835 and creating a light spot 840.

The diagram shown in FIG. 8b illustrates a scanning DMD 855 operating in a continuous movement mode. The scanning DMD 855 may be illuminated by light from the light source 810, wherein light from the light source passes through the aperture 815 to produce the light beam 820. The continuous movement of the micromirrors may reflect the light beam 820, forming a plurality of light beams, such as light beam 860 and light beam 865. The plurality of light beams forms a trail of light 870 on a display plane. The trail of light 870 may be substantially bright throughout its entirety, or in a portion of its entirety, such as in a middle region of the trail of light 870.

Figures 9A, 9B:
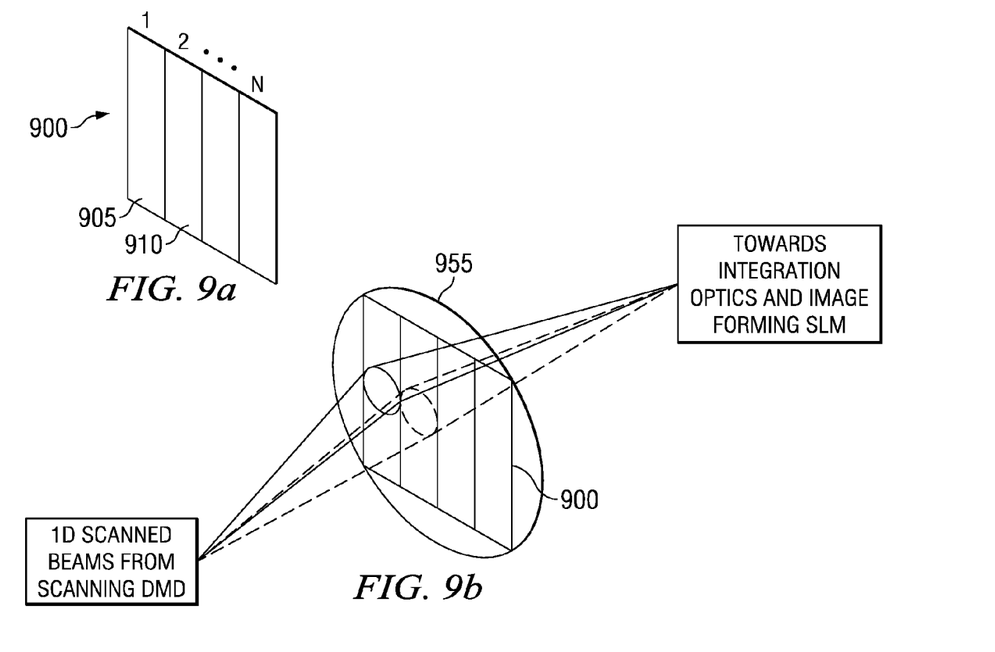
FIGS. 9a and 9b are diagrams of a diffuser patterned with one-dimensional orthogonal phase codes and a portion of an illumination system with a diffuser.

FIG. 9a illustrates a diffuser 900, wherein the diffuser 900 features a pattern with a one-dimensional orthogonal phase code. The orthogonal phase codes may be derived from an orthogonal matrix (an orthogonal matrix is a matrix in which each row (or column) is orthogonal to all the other rows (or columns)). A Hadamard matrix is an example of an orthogonal matrix. Each orthogonal phase code may represent one row (or column) from a Hadamard matrix. All orthogonal codes in a set should come from either the rows or the columns of an orthogonal matrix. A Hadamard matrix of order N may produce an N orthogonal phase codes for use in the diffuser 900. Other orthogonal and non-orthogonal phase codes may also be used, for example, random phase codes.

The one-dimensional orthogonal phase codes may be arranged in columns or rows, such as column 905 and column 910, over the diffuser 900. The arrangement of the one-dimensional orthogonal phase codes should be such that the scanning beam traverses each phase code at least once during the scan time. Hence, if the scanning is along the horizontal axis then the phase codes should be oriented along the vertical axis, i.e., arranged in columns as shown in FIG. 9a. The scanned light moving over the diffuser 900 may produce a continually changing phase-front of the traversing light and this may reduce the visual appearance of speckle. Scanning light over the diffuser 900 may be simpler, faster, cheaper, consume less power, and more reliable than moving the diffuser 900 in a fixed light beam.

Due to the continuous motion nature of the beam scanning approach, speckle reduction may be significantly better since there are substantially no motion stops as compared to the case where an orthogonal diffuser is linearly moved back and forth in one dimension. Such one dimensional linear motions are typically characterized by a slow start from rest, rapid transition in the middle of the motion travel and again a slowing down towards the end, and a complete stop at the end point. This process then repeats itself. Therefore, the laser beam may spend more time traversing though codes at the end of the motion travel path than in the middle and hence speckle reduction may not optimal. An improvement may comprise a diffuser with orthogonal phase codes with varying dimensions to compensate for the varying speed of the linear motion. For example, orthogonal phase codes in the middle of the diffuser may be larger than the orthogonal phase codes gradually farther out from the center of the diffuser to provide substantially equal time for the beam traversing through different phase codes. The presence of orthogonal phase codes may reduce speckle up to a factor of $1/\sqrt{N}$ where N is the order of the orthogonal matrix.

FIG. 9b illustrates a portion of an illumination system, such as the light source 210, showing that the diffuser 900 may be placed on or in a lens 955 that may serve to redirect light passing through the diffuser 900 so that light passing through the diffuser 900 reconverges towards an optical path of the illumination system. The light then passes on towards integration optics and an image forming spatial light modulator (SLM). The diffuser 900 and the lens 955 may be placed in between the scanning DMD 255 and the lens 257 or they may replace the lens 257. A scanned beam of light, as produced by the scanning DMD 255, traverses through the different one-dimensional orthogonal phase codes and each of the different one-dimensional orthogonal phase codes produces a different speckle pattern. These speckle patterns are averaged by the human eye and the results may be a despeckled image with about a factor of $1/\sqrt{N}$ speckle reduction.

Figure 10A:
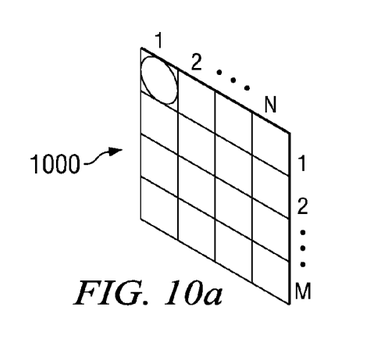
FIGS. 10a and 10b are diagrams of a diffuser patterned with two-dimensional orthogonal phase codes and a portion of an illumination system with a diffuser.
Figure 10B:
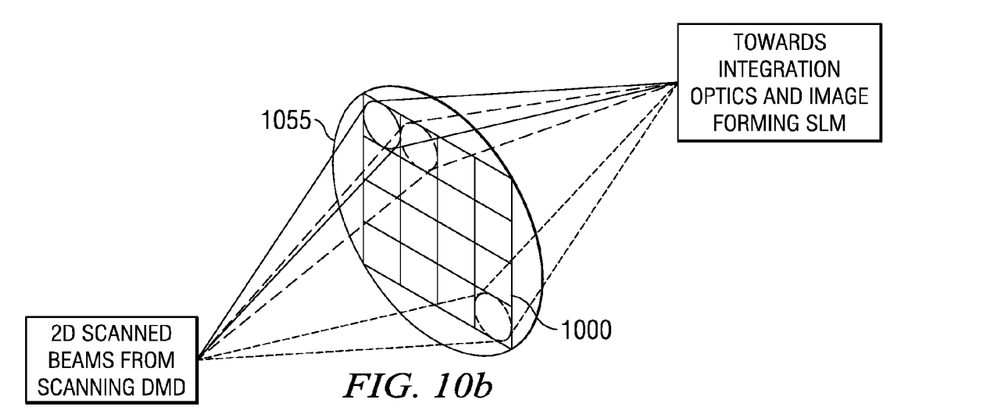

Similarly, FIG. 10a illustrates a diffuser 1000, wherein the diffuser 1000 features a pattern with a two-dimensional orthogonal phase code. The diffuser 1000 may be used in a light source that includes two scanning DMDs. The two-dimensional orthogonal phase codes may be arranged in columns and rows over the diffuser 1000. The arrangement of the two-dimensional orthogonal phase codes may correspond to scanning orientations of micromirrors in the scanning DMDs. FIG. 10b illustrates a portion of an illumination system showing that the diffuser 1000 may be placed on or in a lens 1055.

Figure 11A:
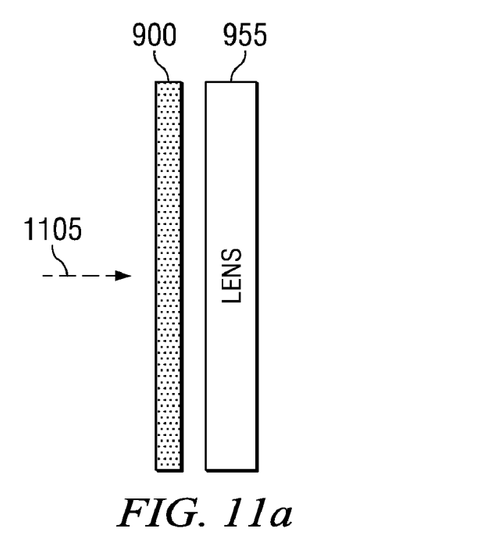
FIGS. 11a through 11d are diagrams of exemplary embodiments of a diffuser and lens combination.
Figure 11B:
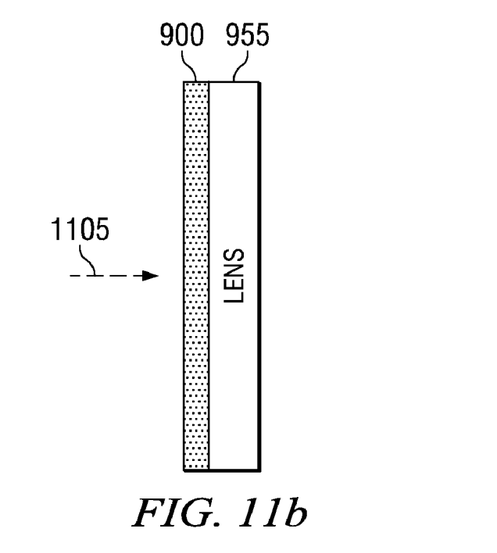
Figure 11C:
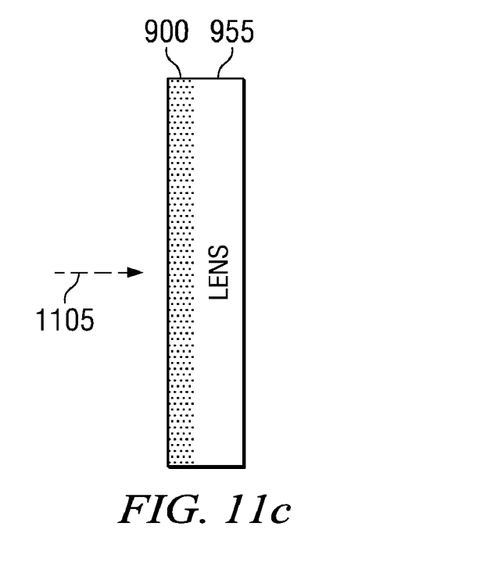
Figure 11D:
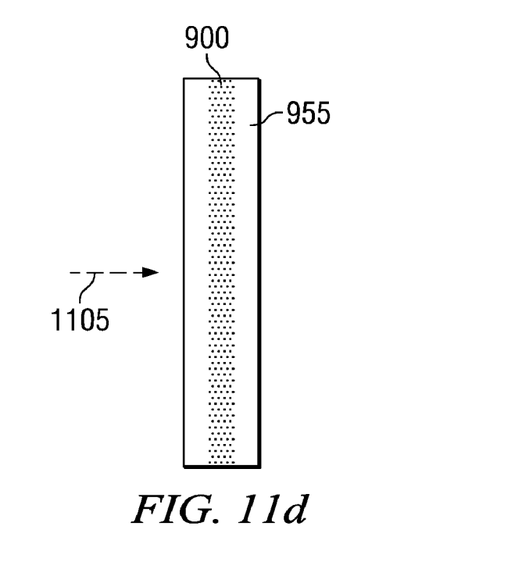

FIGS. 11a through 11d illustrate several exemplary embodiments of a combination of the diffuser 900 and the lens 955. The diffuser 900 may be physically disjoint from the lens 955 (FIG. 11a). The diffuser 900 and the lens 955 may be separate entities that may be attached to each other via glue, adhesive, and so forth (FIG. 11b). Similarly, the diffuser 900 may be formed in a molding process with the lens 955 so that collectively, they are a single unit (FIG. 11c). Alternatively, the diffuser 900 may be embedded inside the lens 955 (FIG. 11d).

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A light source comprising:
   a coherent light source to produce coherent light;
   a first micromirror device containing a first plurality of micromirrors, optically coupled to the coherent light source, the first micromirror device to substantially continuously scan the coherent light with the first plurality of micromirrors;
   a second micromirror device containing a second plurality of micromirrors, optically coupled to the coherent light source and electrically coupled to the controller input, the second micromirror device receiving the scanned coherent light from the first micromirror device and substantially continuously scanning the coherent light with the second plurality of micromirrors; and
   a controller input electrically coupled to the first micromirror device, the controller input configured to provide micromirror control commands to the first micromirror device.

2. The light source of claim 1, further comprising:
   a first lens positioned in a light path of the coherent light source after the coherent light source and before the first micromirror device, the first lens to collimate the light from the coherent light source; and
   a second lens positioned in the light path after the first micromirror device, the second lens to redirect a beam of coherent light reflected from the first micromirror device towards the light path of the coherent light source.

3. The light source of claim 1, wherein the micromirrors pivot along a pivotal axis, and wherein a first pivotal axis of the first micromirror device is orthogonal to a second pivotal axis of the second micromirror device.

4. The light source of claim 1, wherein the first plurality of micromirrors of the first micromirror device and the second plurality of micromirrors of the second micromirror device are moved asynchronously.

5. The light source of claim 1, wherein the coherent light source comprises multiple coherent light sources, the multiple coherent light sources configured to produce coherent light at different wavelengths.

6. The light source of claim 1, wherein the coherent light source comprises a laser light source.

7. A light source comprising:
   a coherent light source to produce coherent light;
   a first micromirror device containing a first plurality of micromirrors, optically coupled to the coherent light source, the first micromirror device to substantially continuously scan the coherent light with the first plurality of micromirrors;
   a controller input electrically coupled to the first micromirror device, the controller input configured to provide micromirror control commands to the first micromirror device; and
   a diffuser optically coupled to the first micromirror device and positioned in a light path of the coherent light source after the first micromirror device, the diffuser to change the phase of light passing through the diffuser either randomly or in discrete steps.

8. The light source of claim 7, wherein the diffuser comprises a pattern, and wherein the pattern is selected from a group consisting of: a random phase pattern, a plurality of one-dimensional orthogonal phase patterns, a plurality of two-dimensional orthogonal phase patterns, and combinations thereof 9. The light source of claim 7, further comprising a lens optically coupled to the first micromirror device and positioned in the light path of the coherent light source after the diffuser, the lens to redirect light back towards the light path after the light passes through the diffuser.

10. The light source of claim 9, wherein the diffuser is attached to the lens, formed inside the lens, molded with the lens, or embossed or engraved on the surface of the lens.

11. A display system comprising:
   a light source to produce coherent light, the light source comprising,
   a coherent light source to produce coherent light, and
   a first micromirror device having a first plurality of micromirrors, optically coupled to the coherent light source and positioned in a light path of the coherent light source after the coherent light source, the first micromirror device to direct the coherent light by moving the micromirrors of the first plurality of micromirrors through a first range of tilt angles substantially continuously;
   an array of light modulators optically coupled to the light source and positioned in a light path of the first micromirror device after the first micromirror device, the array of light modulators configured to produce images by modulating light directed from the first micromirror device based on image data; and a controller electronically coupled to the array of light modulators and to the light source, the controller configured to load image data into the array of light modulators and to control movement of micromirrors in the first plurality of micromirrors.

12. The display system of claim 11, wherein the light source further comprises a second micromirror device containing a second plurality of micromirrors, optically coupled to the light source and positioned in the light path of the light source after the light source, the second micromirror device configured to direct the coherent light by moving the micromirrors of the second plurality of micromirrors through a second range of tilt angles substantially continuously, wherein the micromirrors of the first plurality of micromirrors pivot about a first pivotal axis and the micromirrors of the second plurality of micromirrors pivot about a second pivotal axis, and the first pivotal axis is orthogonal to the second pivotal axis.

13. The display system of claim 11, further comprising a display plane positioned in the light path after the array of light modulators, the display plane configured to display the images produced by the array of light modulators.

14. The display system of claim 11, wherein the display system displays images at a frame refresh rate, and wherein a time period of motion of micromirrors of the first micromirror device is equal to or greater than the frame refresh rate.

* * * * *